United States Patent
Dickey et al.

(10) Patent No.: US 7,387,485 B2
(45) Date of Patent: Jun. 17, 2008

(54) CARTRIDGE TRANSPORT ASSEMBLY

(75) Inventors: Peter Dickey, Costa Mesa, CA (US); Raoul Standt, Newport Beach, CA (US); John Edward Maroney, Irvine, CA (US)

(73) Assignee: Quantum Corporation, San Jose, CA (US)

( * ) Notice: Subject to any disclaimer, the term of this patent is extended or adjusted under 35 U.S.C. 154(b) by 247 days.

(21) Appl. No.: 10/675,376

(22) Filed: Sep. 29, 2003

(65) Prior Publication Data
US 2005/0069400 A1 Mar. 31, 2005

(51) Int. Cl.
B65G 1/137 (2006.01)

(52) U.S. Cl. .......................... 414/277; 414/280; 901/16; 360/92.1; 369/30.38; 369/30.39; 369/30.43; 369/30.45

(58) Field of Classification Search ................ 414/277, 414/278, 280; 901/16; 360/92, 92.1; 369/30.38, 369/30.39, 30.43, 30.45
See application file for complete search history.

(56) References Cited

U.S. PATENT DOCUMENTS

| | | | | |
|---|---|---|---|---|
| 3,746,189 | A | * | 7/1973 | Burch et al. ................ 414/273 |
| 4,229,136 | A | * | 10/1980 | Panissidi .................... 414/673 |
| 4,928,245 | A | | 5/1990 | Moy et al. |
| 5,015,139 | A | * | 5/1991 | Baur .......................... 414/281 |
| 5,043,962 | A | * | 8/1991 | Wanger et al. ........... 369/30.48 |
| 5,183,999 | A | * | 2/1993 | Hakenewerth et al. ...... 235/379 |
| 5,471,561 | A | | 11/1995 | Cowgill et al. |
| 5,544,146 | A | * | 8/1996 | Luffel et al. ............. 369/30.45 |
| 5,548,521 | A | * | 8/1996 | Krayer et al. ............... 700/214 |
| 5,613,154 | A | | 3/1997 | Burke et al. |
| 5,760,995 | A | | 6/1998 | Heller et al. |
| 5,886,853 | A | | 3/1999 | Yoshida et al. |
| 5,925,119 | A | | 7/1999 | Maroney |
| 6,094,322 | A | * | 7/2000 | Nakagomi et al. ............ 360/92 |

(Continued)

FOREIGN PATENT DOCUMENTS

EP 0 016 330 A1 10/1980

(Continued)

OTHER PUBLICATIONS

European Search Report mailed Jun. 1, 2007 for European Patent Application No. 04255518, three pages.

Primary Examiner—Saul J. Rodriguez
Assistant Examiner—M. Scott Lowe
(74) Attorney, Agent, or Firm—Morrison & Foerster LLP

(57) ABSTRACT

Storage library systems and methods of operating and assembling library systems are provided. The storage library system may include a stationary support member having a first axis and a cartridge transport assembly. The cartridge transport assembly includes a cartridge retrieving mechanism configured to retrieve a removable media cartridge, said cartridge transport assembly being coupled to the support member, wherein the cartridge retrieving mechanism is positionable in four degrees of freedom. The method of operating a tape library may include transmitting instruction signals to a robotics controller disposed on a cartridge transport assembly, translating the cartridge transport assembly along a stationary support member, and positioning the cartridge retrieving mechanism in four degrees of freedom relative to the stationary support member.

5 Claims, 15 Drawing Sheets

U.S. PATENT DOCUMENTS

| | | | |
|---|---|---|---|
| 6,135,697 A * | 10/2000 | Isaacs et al. | 414/281 |
| 6,438,623 B1 | 8/2002 | Ryan | |
| 6,483,204 B2 * | 11/2002 | Hanaki | 307/23 |
| 6,488,462 B1 | 12/2002 | Williams | |
| 6,564,290 B1 * | 5/2003 | Lechner | 711/111 |
| 6,580,582 B1 | 6/2003 | Caverly | |
| 7,100,173 B2 * | 8/2006 | Takano | 369/30.39 |

FOREIGN PATENT DOCUMENTS

| | | |
|---|---|---|
| EP | 0 016 330 B1 | 10/1980 |
| EP | 1 306 836 A1 | 5/2003 |
| WO | WO-01/09888 A1 | 2/2001 |

* cited by examiner

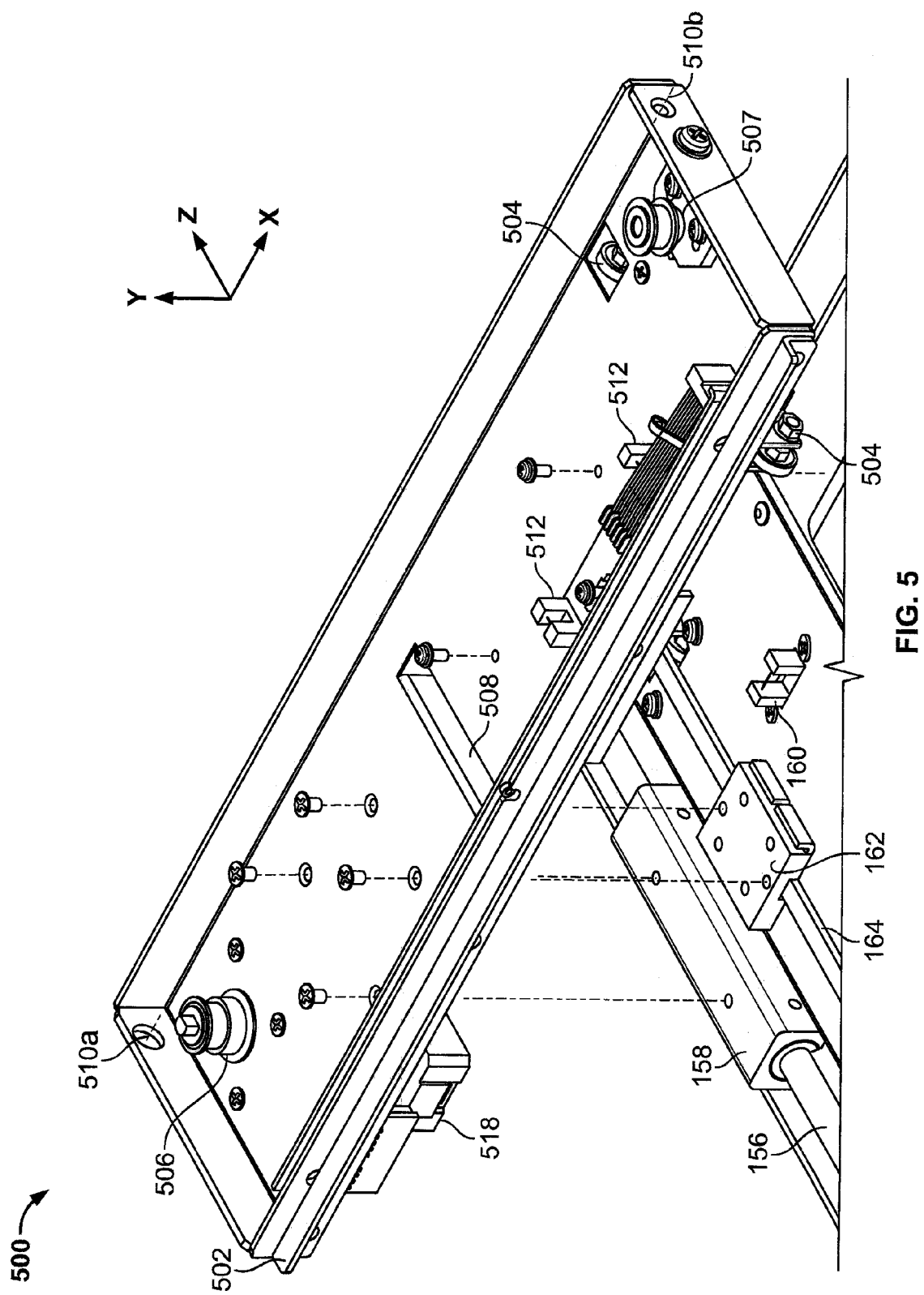

CARTRIDGE TRANSPORT ASSEMBLY

FIELD OF THE INVENTION

The present invention relates to storage libraries. More specifically, the present invention relates to cartridge transfer mechanisms for tape storage libraries.

BACKGROUND OF THE INVENTION

Magnetic tape cartridges have proven to be an efficient and effective medium for data storage in computer systems. Large computer systems may utilize numerous cartridges for data storage purposes as well as a plurality of tape drives for reading and/or writing data to and from storage cartridges in a timely manner. Typically, as the number of storage cartridges grows, it becomes more efficient to organize the cartridges in automated storage libraries. Automated storage libraries including magnetic tape cartridges may improve access speed and reliability of data storage systems having large numbers of magnetic tape cartridges.

Automated cartridge libraries generally include a plurality of storage bins or slots for storing library tape cartridges, a cartridge transport mechanism including a robotic cartridge retrieval mechanism (often referred to as a "picker"), and one or more tape drives. The robotic picker may be controlled to select a specific storage tape cartridge from the library and transfer the tape cartridge between a storage slot and a tape drive within seconds. The robotic picker typically includes a "gripper" mechanism positioned on the robotic picker. A plurality of actuator mechanisms are disposed in the library for positioning the gripper at the desired location and in the desired orientation in order to retrieve the desired cartridge from a storage bin. After the robotic picker has positioned the gripper near the desired tape cartridge, the gripper may be activated to engage or grip the tape cartridge to remove the cartridge from the storage bin. The robotic arm may move the gripper and tape cartridge to a location to load the tape cartridge into a tape drive, load port (for adding or removing tapes from the library), and the like.

Another configuration for a storage library features a roughly cylindrical chamber, with racks provided along the interior of the circular wall. The retrieval/loading transport mechanism is positioned in the center of the chamber and is operated in a cylindrical coordinate fashion. In this configuration, the tape cartridges are positioned around the transport mechanism at equal radial distances, resulting in a roughly cylindrical library enclosure.

It may be desirable to provide a cartridge transport assembly that can reliably position a cartridge retrieval mechanism within a storage library system enclosure without an excessive amount of mechanical support and positioning components. It may be further desirable to provide a transport assembly that can be tested prior to its incorporation into the storage library system.

BRIEF SUMMARY OF THE INVENTION

In accordance with embodiments of the present invention, a storage library system is provided. The storage library system comprises: a stationary support member having a first axis and a cartridge transport assembly. The cartridge transport assembly comprises a cartridge retrieving mechanism configured to retrieve a removable media cartridge, said cartridge transport assembly being coupled to the support member, wherein the cartridge retrieving mechanism is positionable in four degrees of freedom.

In accordance with other embodiments of the present invention, a storage library system is provided comprising: a stationary support member having a first axis and a cartridge transport assembly coupled to the stationary support member. The cartridge transport assembly comprises: a first carriage coupled to the vertical support member; a first actuator coupled to the first carriage and the stationary support member configured to actuate linear movement of the first carriage along the stationary support member; a second carriage movably coupled to the first carriage; a second actuator engaging the first and second carriages configured to actuate linear movement of the second carriage along a second axis non-parallel to the first axis; a third carriage movably coupled to the second carriage; a third actuator engaging the second and third carriages configured to actuate linear movement of the third carriage along a third axis non-parallel to the first axis and the second axis; and a cartridge retrieval mechanism coupled to the third carriage.

In accordance with other embodiments of the present invention, a method of operating a tape library is provided. The method comprises: transmitting instruction signals to a robotics controller disposed on a cartridge transport assembly; translating the cartridge transport assembly along a stationary support member; and positioning the cartridge retrieving mechanism in four degrees of freedom relative to the stationary support member.

In accordance with other embodiments of the present invention, a method of assembling a tape library, comprising: assembling a cartridge transport assembly comprising mounting the cartridge transport assembly to a stationary support member in a storage library system; and prior to mounting the cartridge transport assembly to the stationary support member, testing four degrees of freedom of movement of the cartridge retrieval mechanism.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

BRIEF DESCRIPTION OF THE DRAWINGS

FIG. 5 is a perspective view of an x-axis assembly in accordance with embodiments of the present invention.

In the following description, reference is made to the accompanying drawings which form a part thereof, and which illustrate several embodiments of the present invention. It is understood that other embodiments may be utilized

DETAILED DESCRIPTION OF THE INVENTION

Figure 1:
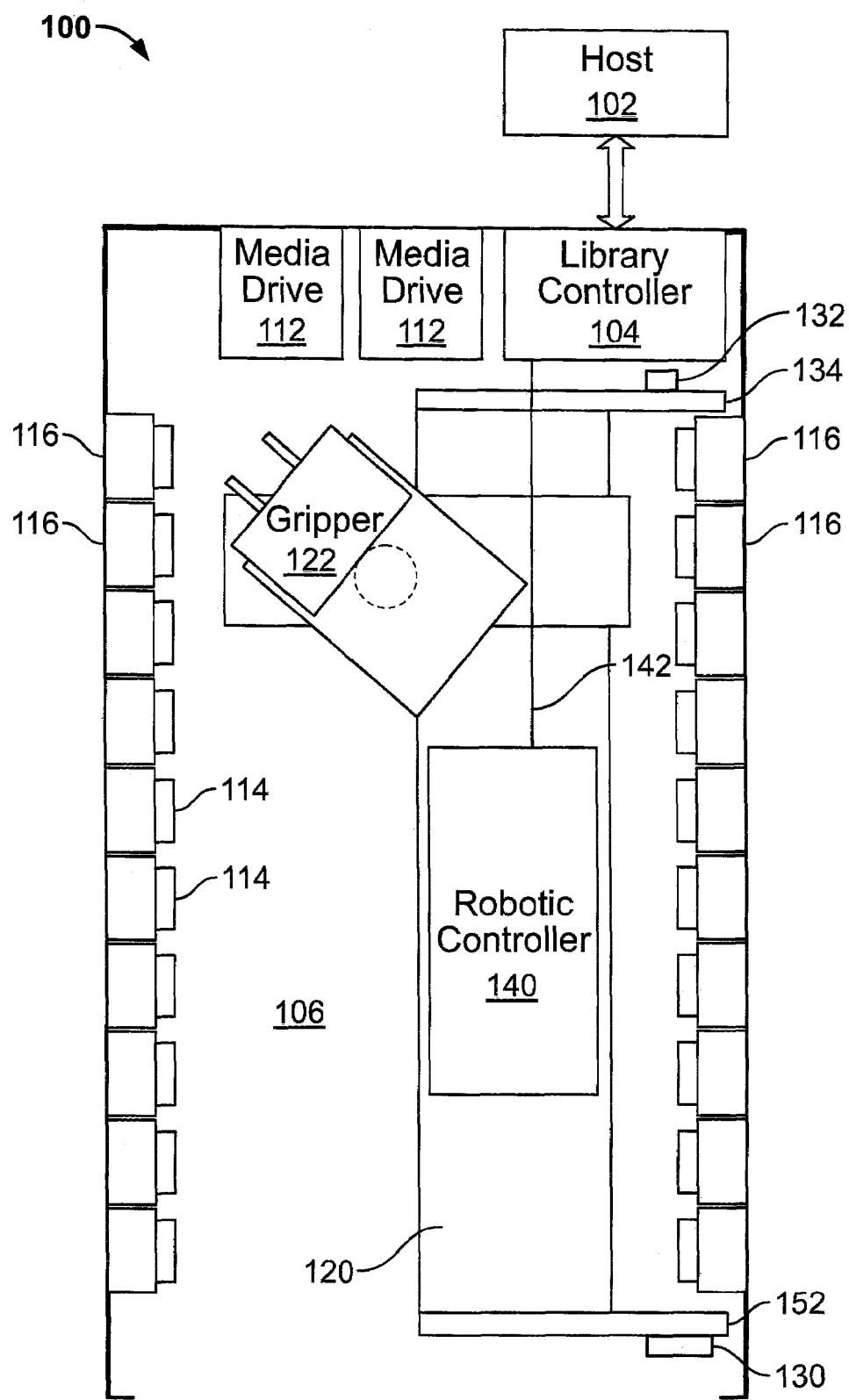
FIG. 1 is a simplified top view of a storage library system in accordance with embodiments of the present invention.
Figure 2A:
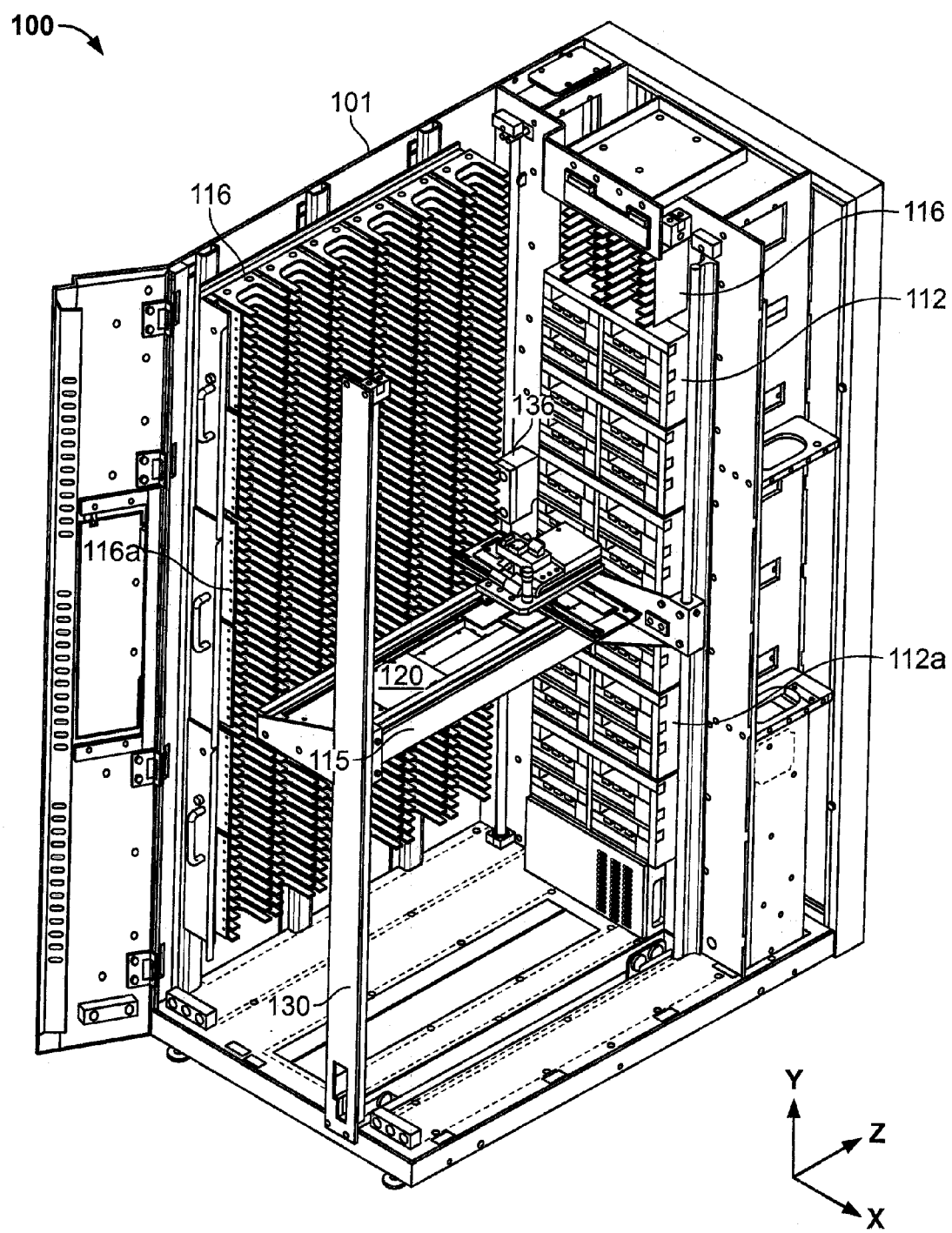
FIGS. 2A-2C are perspective views of a storage library system in accordance with embodiments of the present invention.
Figure 2B:
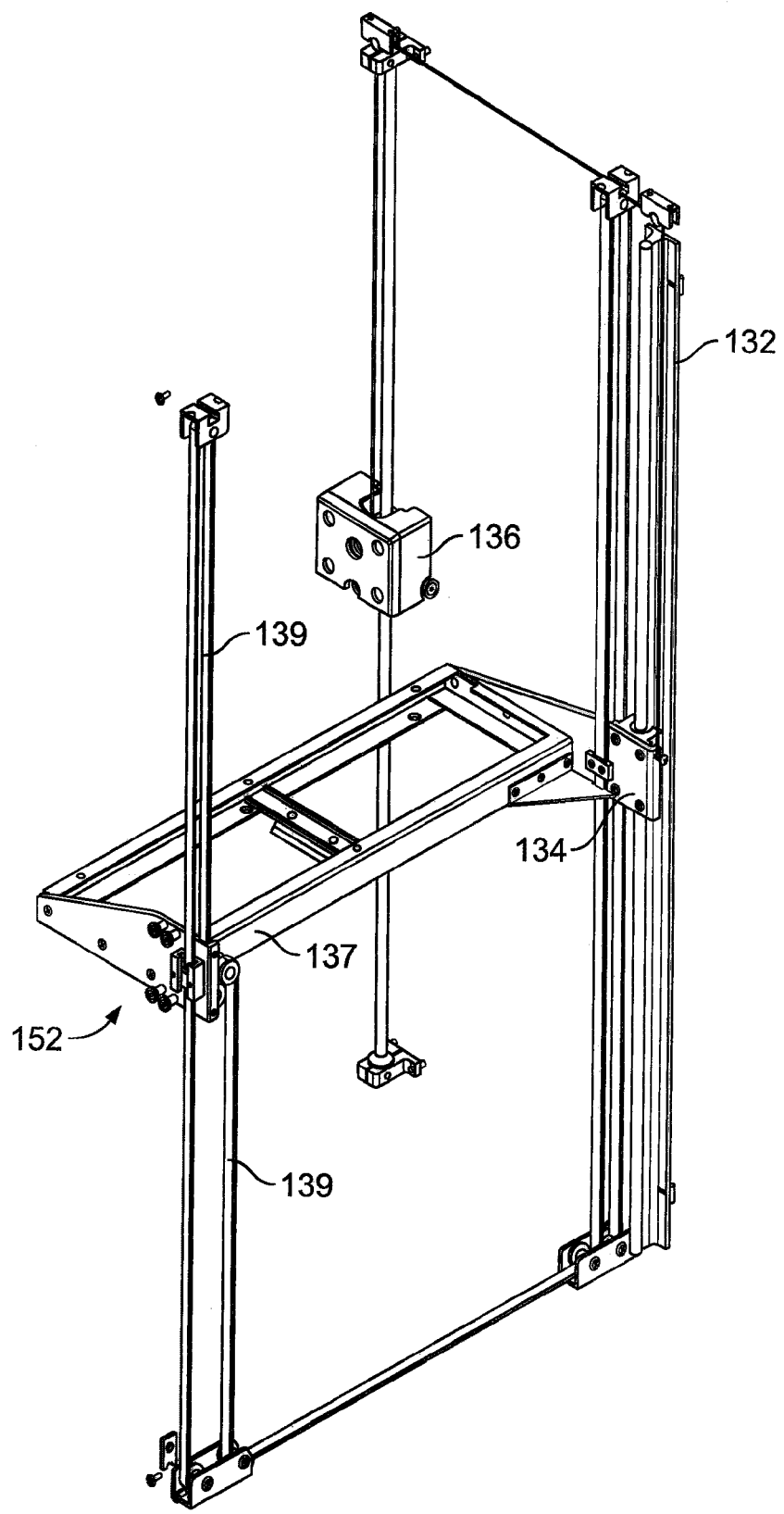

FIG. 1 is a simplified block diagram of an exemplary automated storage library system 100 for the storage and retrieval of a plurality of storage cartridges 114 stored therein. FIG. 2A is a perspective view of the library system 100 with the top and side walls removed for clarity. FIG. 2B is a perspective view of the cartridge transport assembly 120 having the z-axis assembly 150 and other portions removed for clarity. The library system 100 may include an enclosure 101, which houses one or more media drives 112, a plurality of data storage cartridges 114 stored in bins or storage slots 116, a primary support member 132, a supplemental support member 130, and a cartridge transport assembly 120 that may be equipped with a cartridge retrieval mechanism (e.g., a gripper) 122 for transporting a selected cartridge 114 between a media drive 112 and a storage slot 116. The storage library system 100 further includes a library controller 104 that communicates with a host 102 to control the actions of the cartridge transport assembly 120 and media drives 112 to retrieve and/or store data.

The library controller 104 may include a single general purpose computer, microprocessor, microcontroller, and the like. Alternatively, a separate cartridge loader controller and a library system controller may be included. A general library controller 104, tape cartridge loader controller, or library system controller may include any programmable general purpose computer or processor and preferably will have a suitably programmed microprocessor or microcontroller. The input-output connections between the library controller and various other components of the library system 100 may include well-known industry standard cabling and communication protocols. For example, Ethernet, Inter Integrated Circuit bus (I²C), Small Computer System Interface (SCSI), ultra-wide SCSI, fast SCSI, fibre channel, and the like.

The library controller 104 may operate to coordinate movements and actions of media drives 112, cartridge transport assembly 120, and the like. The controller 104 may include a suitable processor as described above and is typically interconnected with a host 102, which sends access commands to controller 104. The data recorded to or read from one or more of the cartridges 114 may be transmitted between one of the drives 112 to the host 102 through the library controller 104, or a second data path connection, e.g., a fibre channel bridge or the like. The library controller 104 may also be coupled to a robotics controller 140 disposed on the cartridge transport assembly 120 via a flexible umbilical data/power cable 142.

Media drives 112 may include, for example, magnetic tape drives and/or optical disk drives, and cartridges 114 may include, for example, magnetic and/or optical storage devices. An exemplary drive includes the SDLT™ 320 magnetic tape drive, and an exemplary storage cartridge includes the Super DLTape™ Type I storage cartridge, both sold by Quantum Corporation. The examples described herein generally relate to a magnetic tape library including multiple magnetic tape cartridges. It should be understood, however, that the various embodiments are contemplated with use for other types of storage media and storage media libraries. For example, a storage library may include optical media devices alone or in combination with magnetic media storage devices and the like.

An automated storage library system 100 may further include various other features such as load ports for manually adding and removing cartridges to and from the library, various access doors, control panels, power supplies, and the like as are known in the art. For clarity, however, such additional features have been omitted from the description.

The cartridge transport assembly 120 selectively moves and positions the tape cartridges 114 within the internal cavity 106 of the tape library 100. More specifically, the transport assembly 120 is adapted to retrieve any one of the tape cartridges 114 from any of the storage bins 116 and transfer the tape cartridges 114 to any one of the media drives 112, another one of the storage bins 116, or elsewhere in the library cavity 106. The cartridge transport assembly 120 may be provided with a cartridge retrieval mechanism 122. The cartridge retrieval mechanism 122 may be configured to grasp the individual cartridges 114 and allows for the transfer of the cartridges 114 within the library cavity 106. The cartridge retrieval mechanism 122 can be designed in various ways, as would be understood by one of ordinary skill in the art.

Figure 2C:
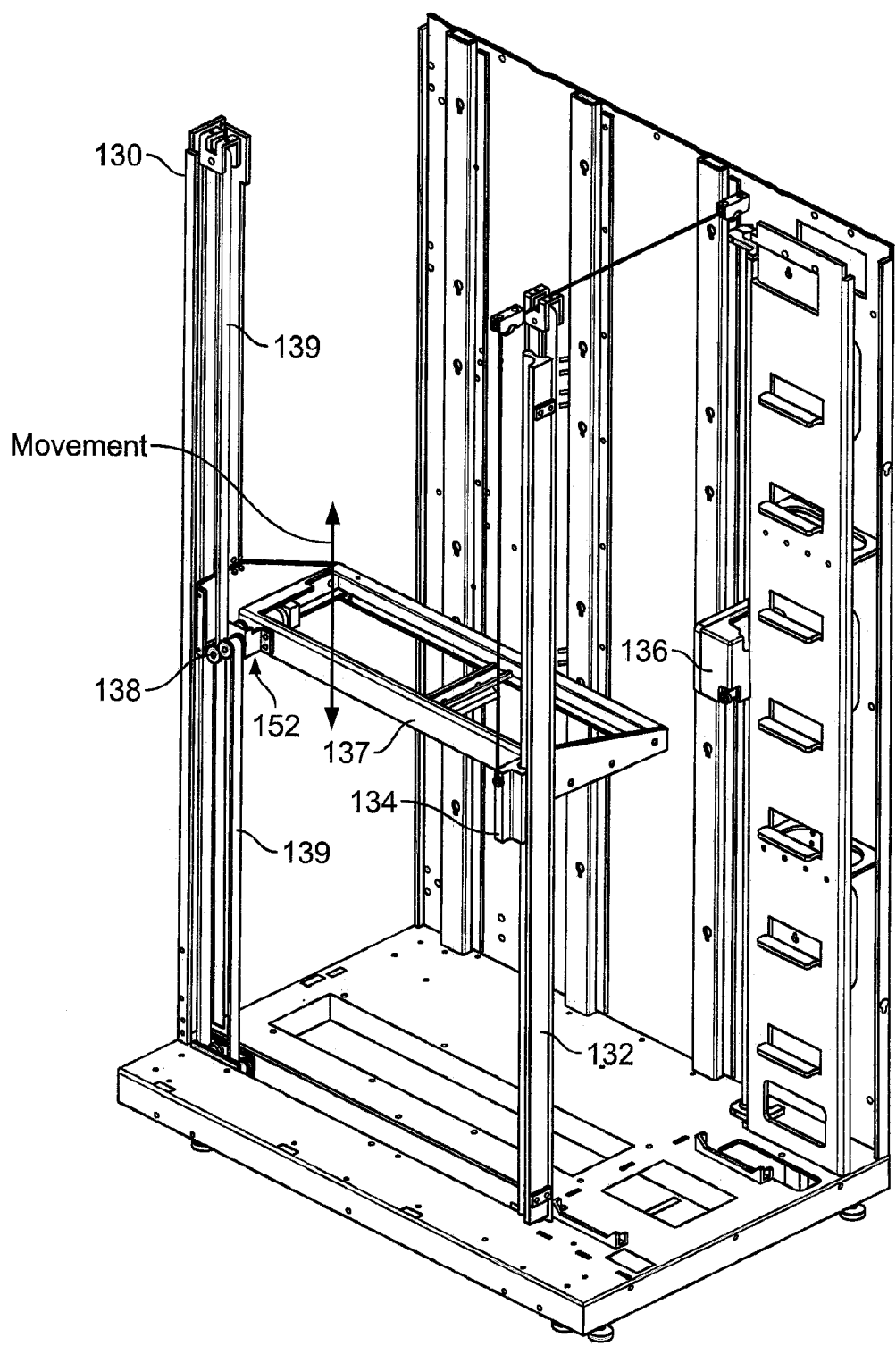
Figure 3:
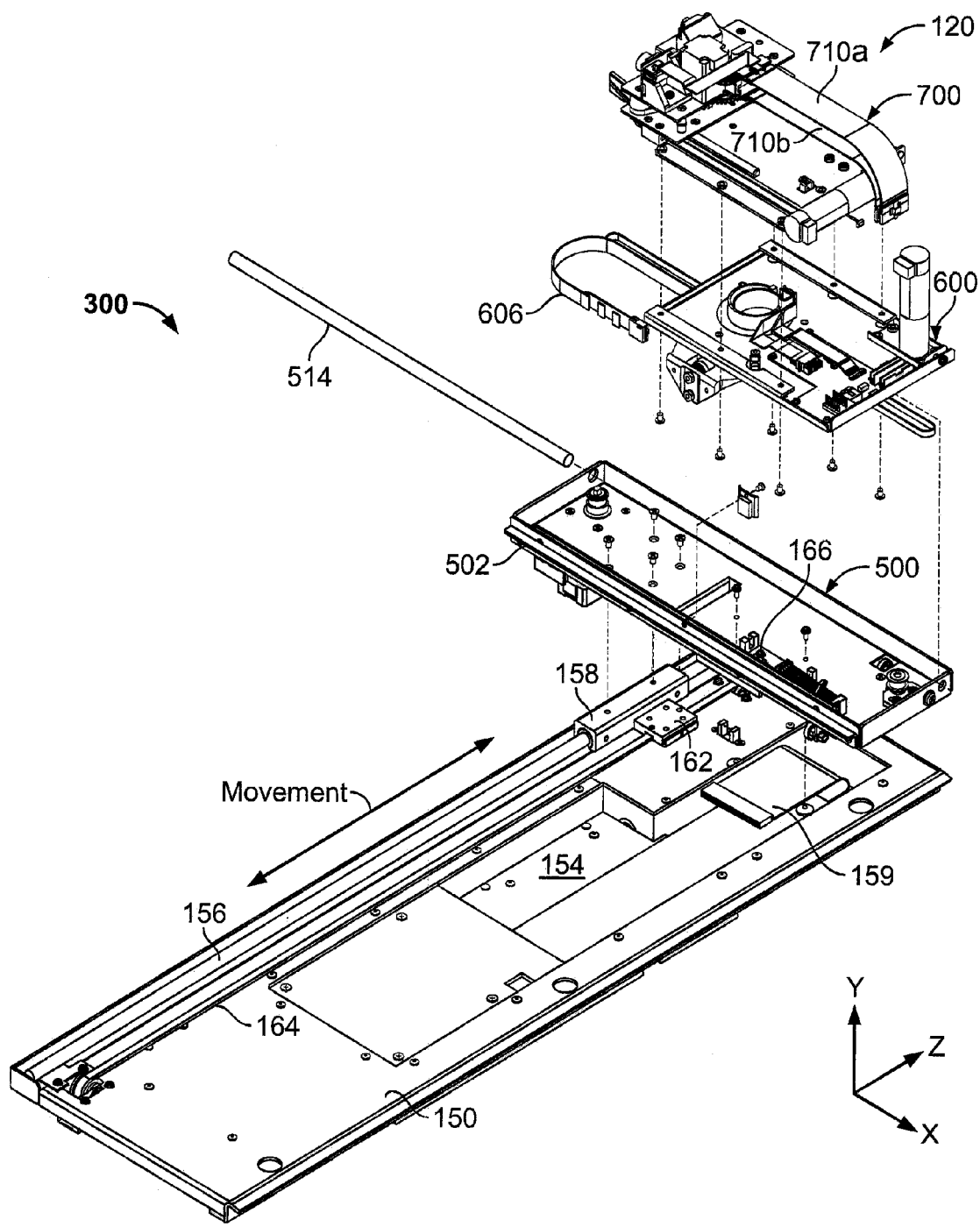
FIG. 3 is a perspective view of a cartridge transport assembly in accordance with embodiments of the present invention.

FIG. 3 is an exploded perspective view of the cartridge transport assembly 120, in accordance with embodiments of the present invention. The cartridge transport assembly 120 includes a z-axis assembly 150, which may be coupled to the primary support member 132 and the secondary support member 130 via a z-axis carriage 137, as shown in FIGS. 2A-2C. The z-axis assembly 150 supports an x-axis assembly 500, which supports a rotary assembly 600, which, in turn, supports an extension assembly 700. The cartridge retrieval mechanism 122 is supported by the extension assembly 700. These components comprise a robotic sub-assembly 300.

Figure 4A:
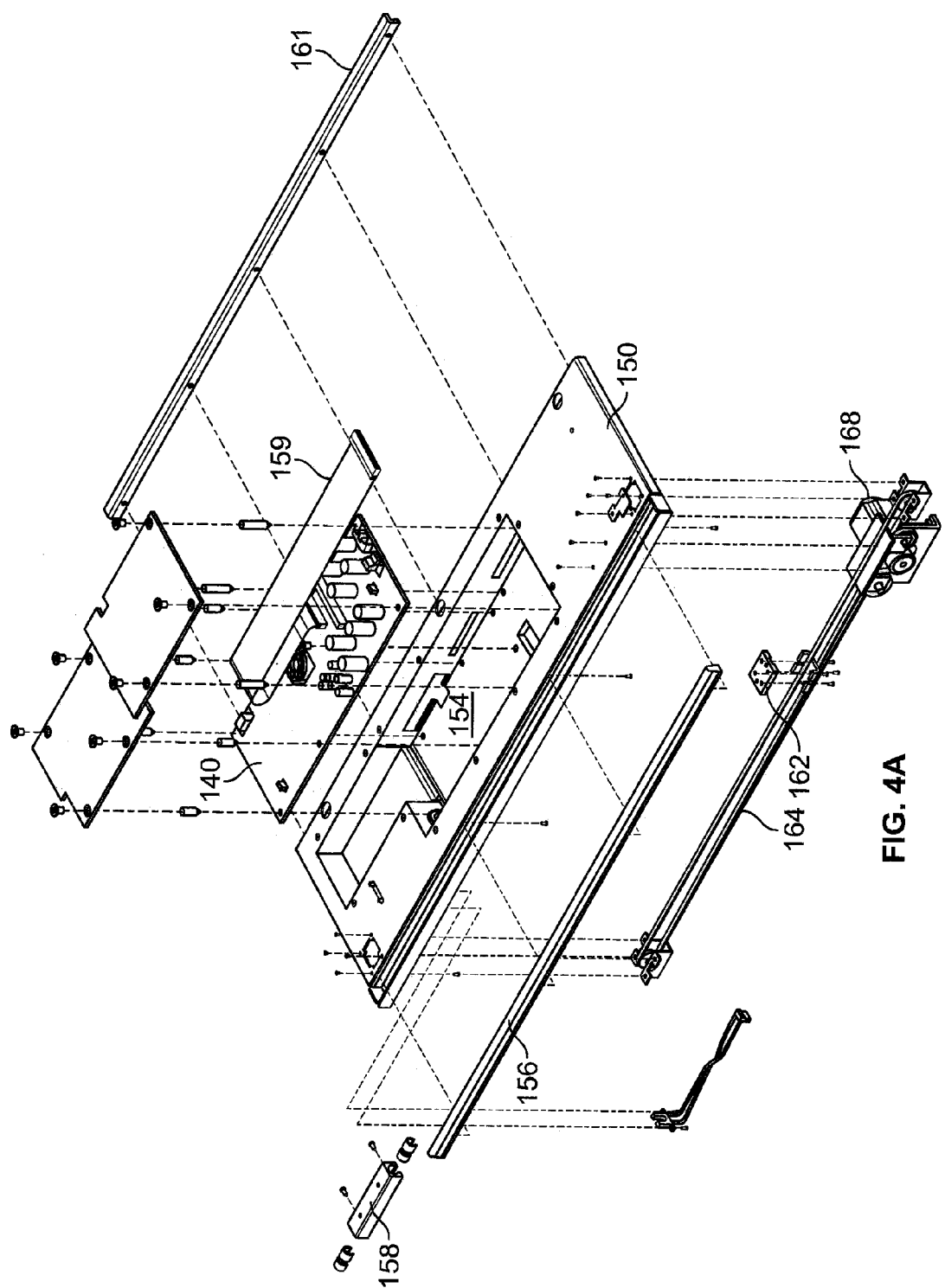
FIGS. 4A-4C are perspective views of a z-axis assembly in accordance with embodiments of the present invention.
Figure 4B:
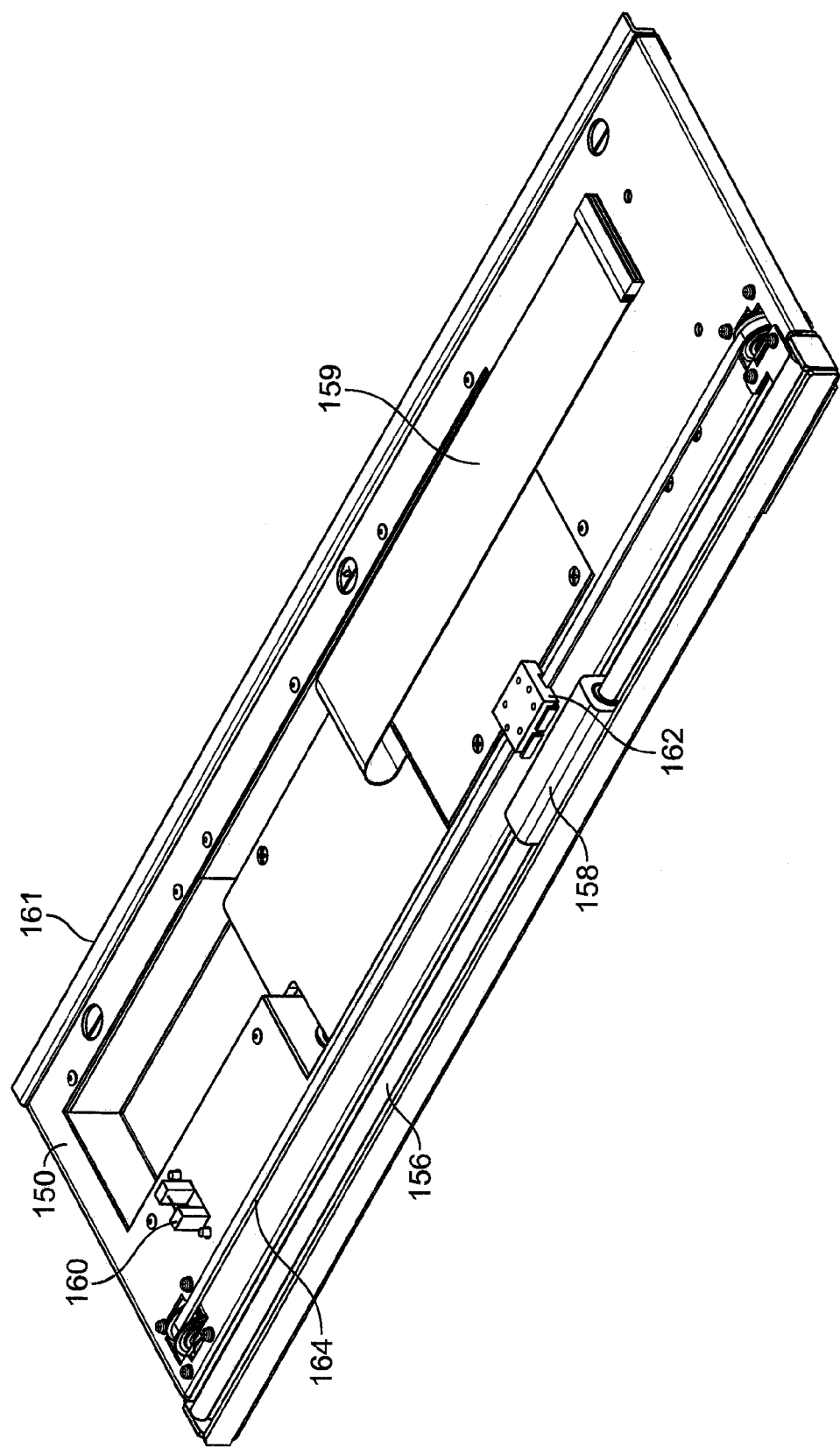
Figure 4C:
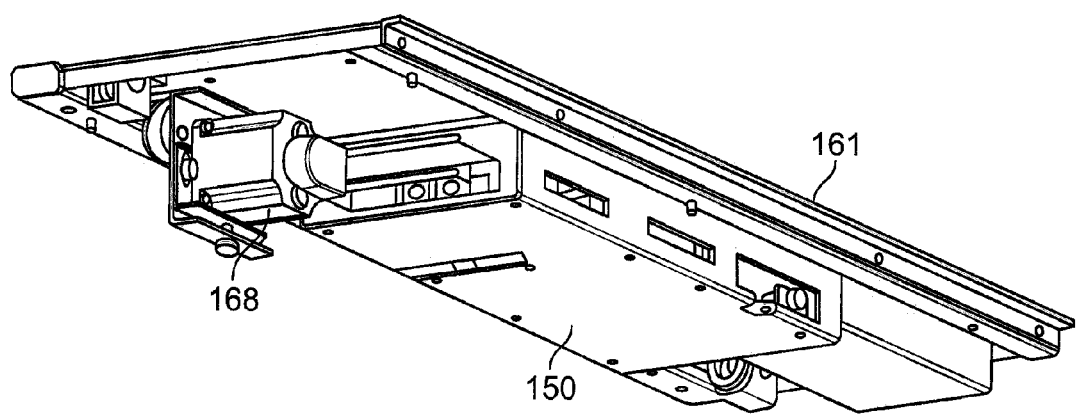

FIGS. 4A-4C illustrate the z-axis assembly 150, in accordance with embodiments of the present invention. FIG. 4A shows an exploded perspective view, FIG. 4B shows a top perspective view, and FIG. 4C shows a bottom perspective view of the z-axis assembly 150. The z-axis assembly 150 may be provided with a y-axis actuator 152 (shown in FIGS. 2B-2C), which effectuates movement of the cartridge transport assembly 120 along the secondary support member 132 in the y-direction. The y-axis actuator 152 may comprise, for example, a DC brush motor coupled to pulleys 138 and belts 139 to actuate movement of the z-axis carriage 137. The z-axis assembly 150 may also be provided with a primary support flange 134, which mates with the primary support member 132, to provide a more balanced support for the cartridge transport assembly 120. The primary support flange 134 may also be coupled to a counterweight 136, which can help to reduce the load on the y-axis actuator 152 when translating the cartridge transport assembly 120 along the y-axis.

The z-axis assembly 150 may also include a recess 154 for receiving the robotics controller 140, which is coupled to the umbilical data/power cable 142. In accordance with embodiments of the present invention, the robotics controller 140 may be configured to receive commands and power from the library controller 104 via the umbilical cable 142, to process those commands to generate specific positioning commands, and to control the positioning of the various actuators of the cartridge transport assembly 120 to position the cartridge retrieval mechanism 122 in the desired positions to perform the desired tasks, as will be described in greater detail below.

The z-axis assembly 150 may be configured to support an x-axis assembly 500 and may be provided with a z-axis actuator configured to translate the x-axis assembly 500 in the z-direction. The z-axis actuator may comprise, for example, a z-axis motor 168, which is coupled to a movable belt 164 to cause lateral movement of a plate 162 mounted on the belt 164. The x-axis assembly 500 is coupled to the plate 162, thereby enabling the z-axis actuator to actuate linear movement in the z-direction of the x-axis assembly 500 relative to the z-axis assembly 150. To provide stability for the movement of the x-axis assembly 500, the x-axis assembly 500 may also be coupled to a slide bearing 158 mounted on a guide rail 156 on the z-axis assembly 150, and have roller bearings 504 (shown in FIG. 5) which engage a guide flange 161. The z-axis assembly 150 may further be provided with a z-axis home sensor 160 that may be used to determine when the x-axis assembly 500 is located at the home position by sensing when a light beam is broken by a flange 508 (shown in FIG. 5) provided on the x-axis assembly 500.

The robotics controller 140 may send data, commands, and other signals to the various components of the cartridge transport assembly 120 via a ribbon cable 159, which is coupled to a ribbon cable interface provided on the x-axis assembly 500. The ribbon cable 159 is of sufficient length that the connection between the ribbon cable 159 and the interface can be maintained throughout the range of motion of the x-axis assembly 500 along the guide rail 156.

The x-axis assembly 500 is shown in enlarged perspective view in FIG. 5. The x-axis assembly 500 may include an x-axis actuator comprising an x-axis motor 518 which is coupled to a pulley 506. A movable belt (not shown) may be provided between the pulley 506 and a second pulley 507. A rotary assembly 600 (shown in greater detail in FIG. 6) is coupled to the belt such that rotation of the pulley 506 caused by the motor 518 actuates linear movement of the rotary assembly 600 in the x-direction relative to the x-axis assembly 500. To provide stability for the movement of the rotary assembly 600, the x-axis assembly 500 may also be provided with a guide flange 502 and a slide bearing mounted on a guide rail 514 (shown in FIG. 3) provided between apertures 510a-510b. The rotary assembly may be coupled to the slide bearing and provided with rollers 602 which engage the guide flange 502, to thereby guide the rotary assembly in its linear movement and provide support for the gripper 122. The x-axis assembly 500 may also be provided with a pair of sensors 512, which can detect the linear position of the rotary assembly 600.

Figure 6A:
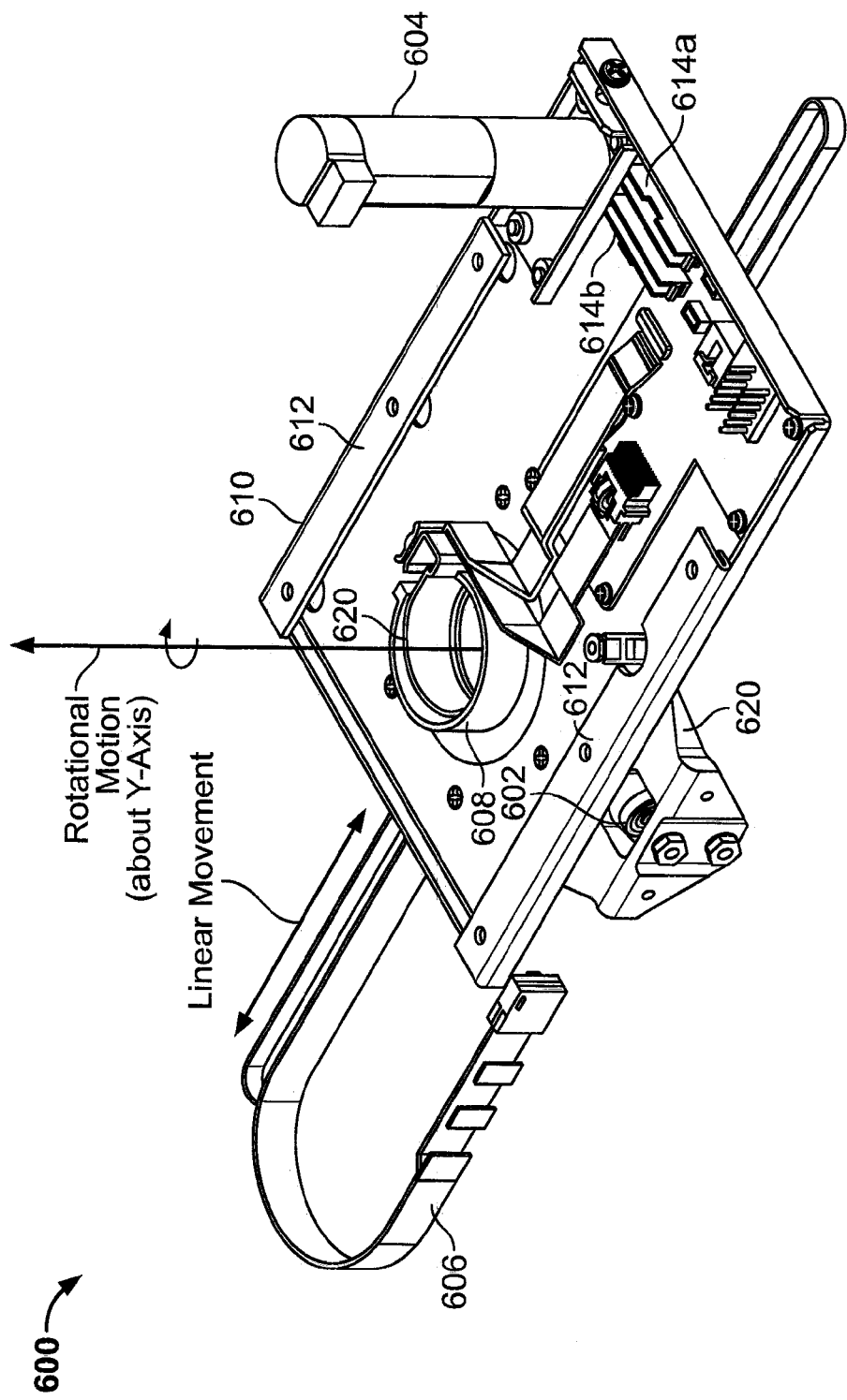
FIGS. 6A-6B are perspective views of a rotary assembly in accordance with embodiments of the present invention.
Figure 6B:
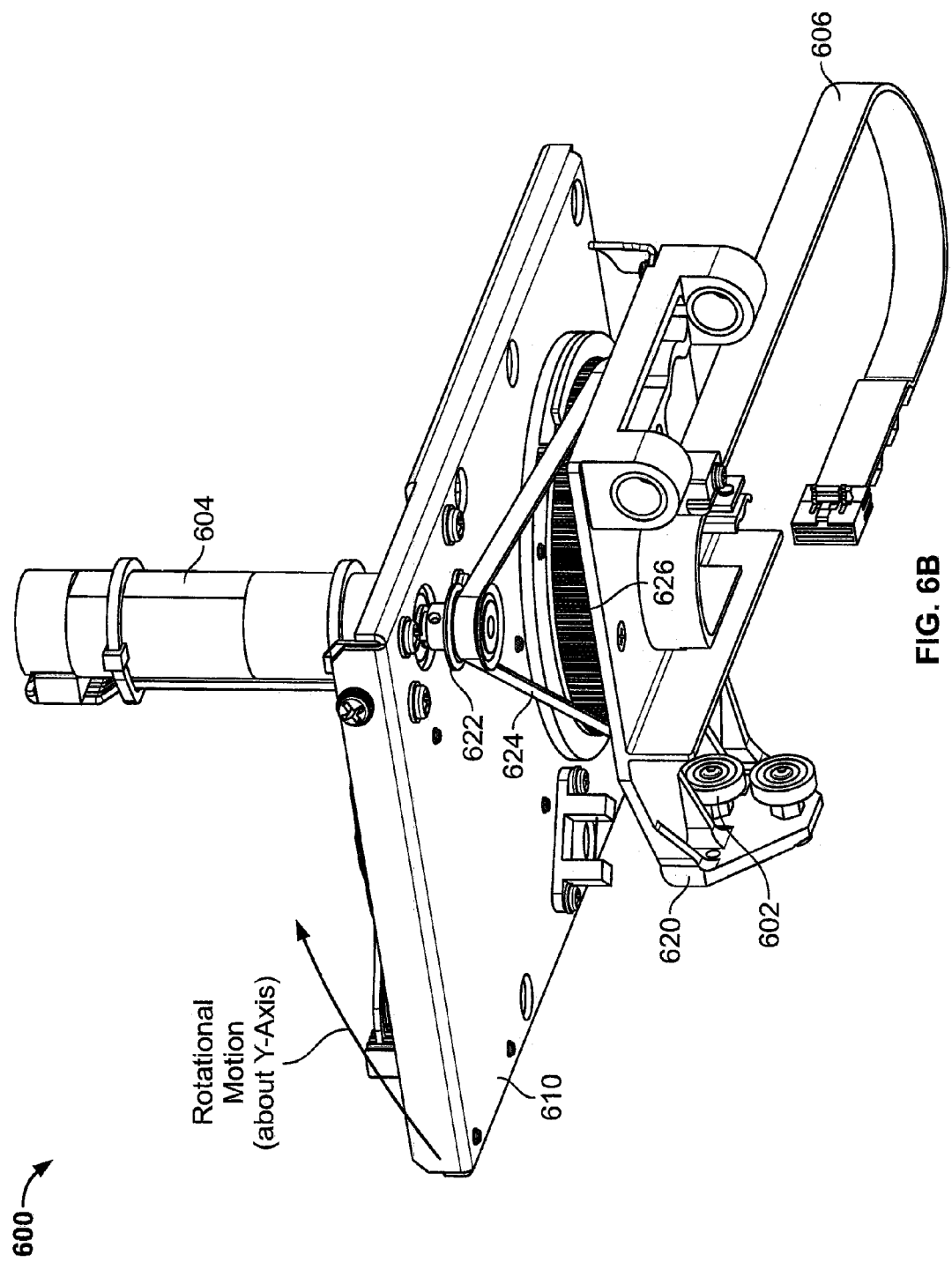

FIG. 6A shows a top perspective view of a rotary assembly 600 which is supported by the x-axis assembly 500 and is configured to slide laterally along the x-axis. FIG. 6B is a bottom perspective view of the rotary assembly 600. In the illustrated embodiment, the rotary assembly 600 comprises a rotating portion 610 rotatably coupled to a base portion 620. The base portion 620 is coupled to the slide bearing and the belt provided on the x-axis assembly and is configured to move linearly along the guide rail and the guide flange 502. The rotating portion 610 includes a motor 604 coupled to a pulley 622, which, in turn, is coupled to a belt 624. The belt 624 engages a hub 626 which protrudes from the base portion 620. Rotation of the motor 604 causes the belt 624 to engage the stationary hub 626, thereby causing the rotating portion 610 to rotate about the y-axis relative to the base portion 620.

The base portion 620 may also include a ribbon cable 606 coupled to an interface provided on the x-axis assembly 500 and having a sufficient length such that the cable 606 may maintain a connection with the interface across the complete range of movement of the rotary assembly 600 in the x-direction. Another ribbon cable 608 is loosely wound about the shaft from the base portion 620 and provides data connectivity between the base portion 620 and the rotational portion 610. This data connection can provide control signals to the motor 604 and the cartridge retrieval mechanism 122.

Figure 7A:
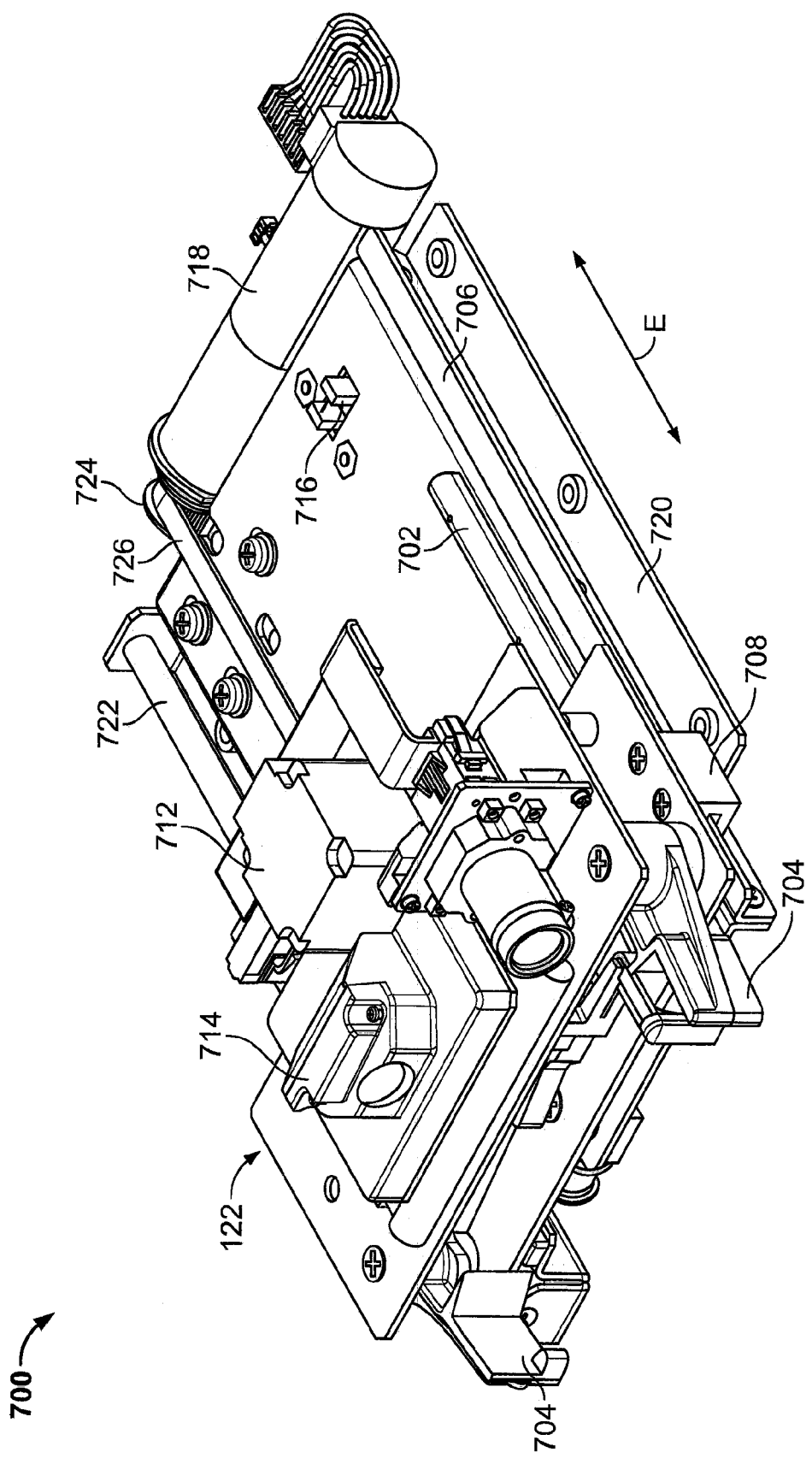
FIGS. 7A-7C are perspective views of an extension assembly and cartridge retrieval mechanism in accordance with embodiments of the present invention.
Figure 7B:
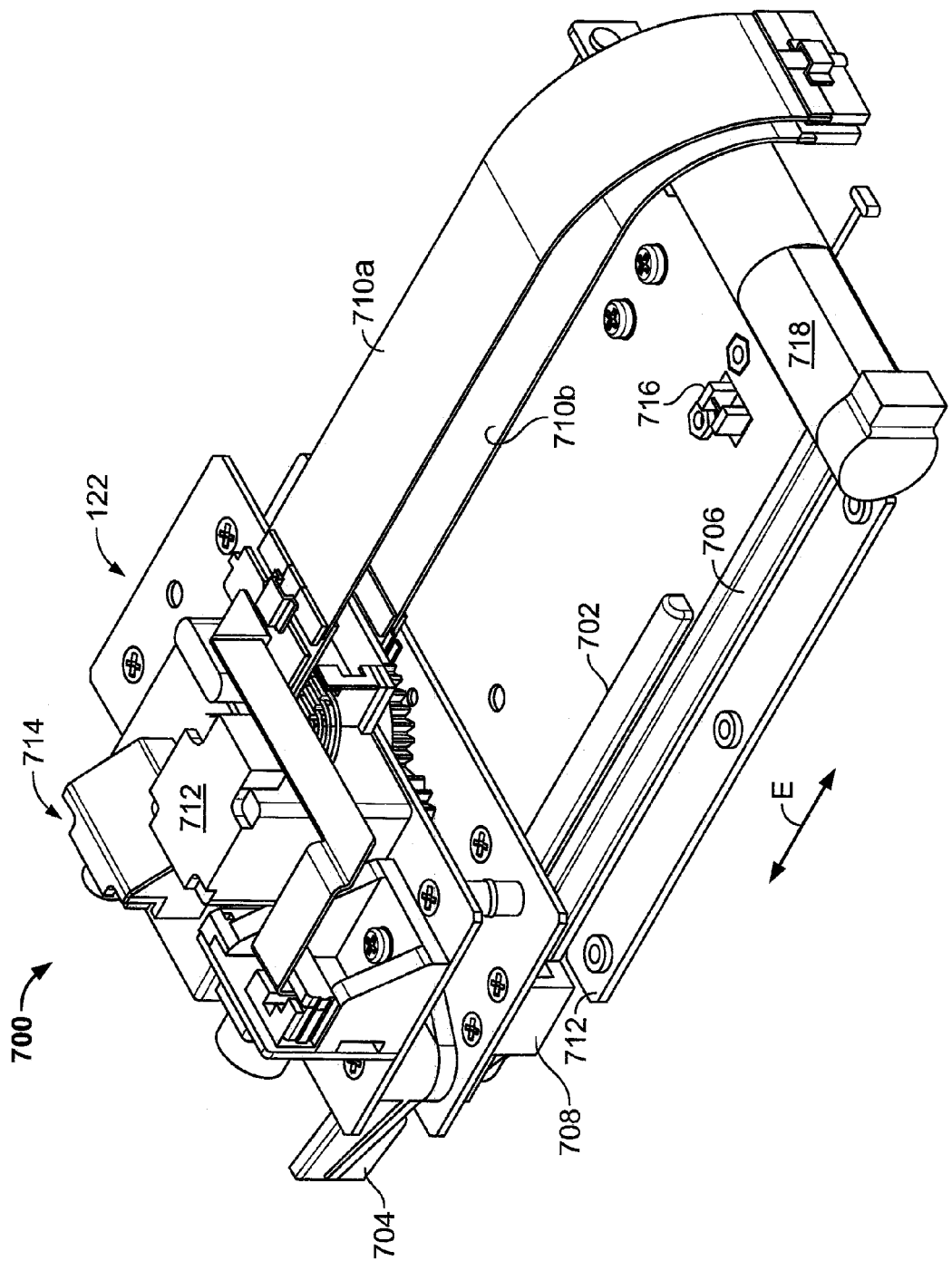
Figure 7C:
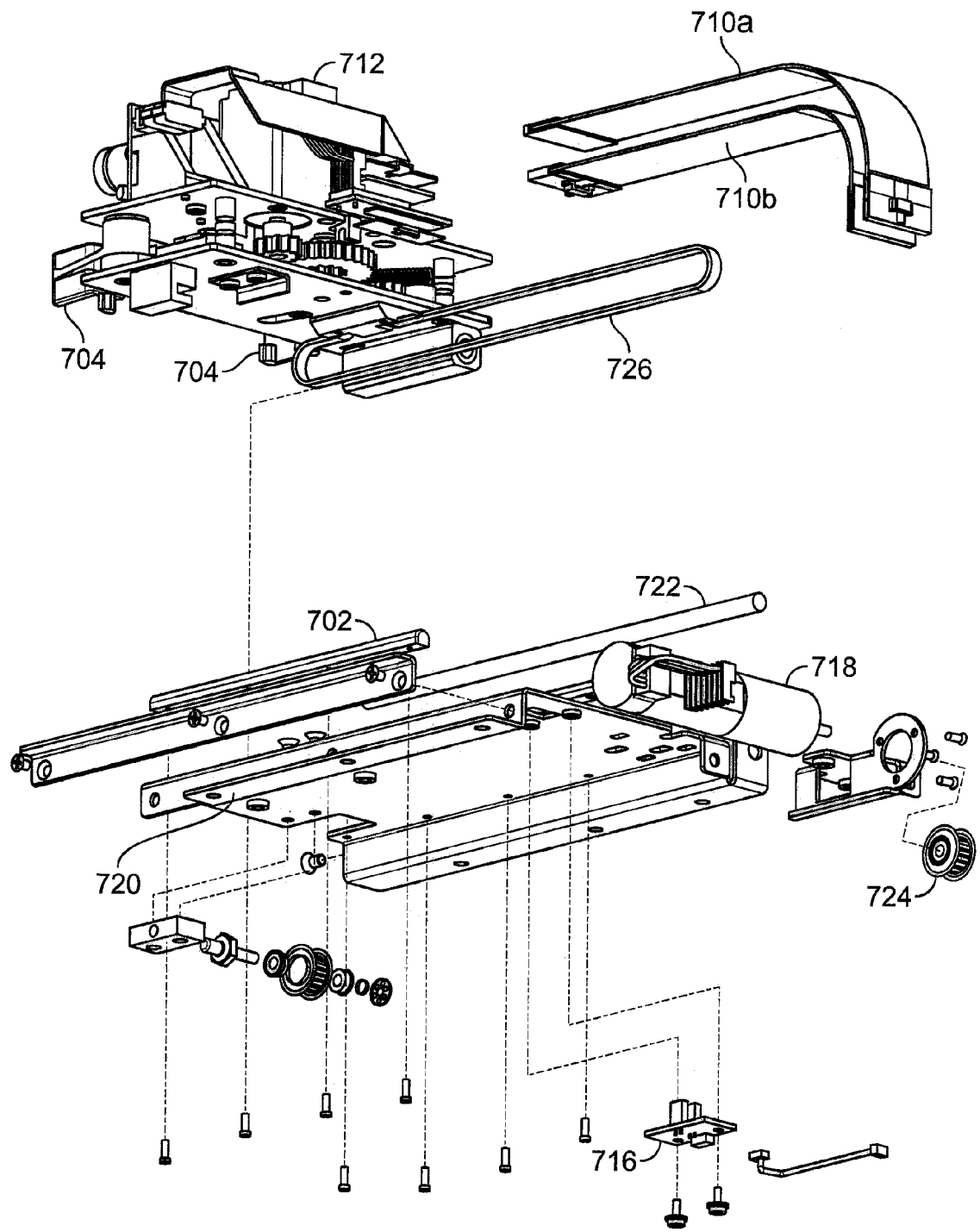

FIG. 7A is a front perspective view of the cartridge retrieval mechanism 122 and an extension assembly 700, FIG. 7B is a rear perspective view, and FIG. 7C is an exploded perspective view. The extension assembly 700 may include a pair of flanges 720 which are coupled with a pair of flanges 612 provided on the rotational portion 610 of the rotary assembly 600 such that the extension assembly 700 rotates with the rotational portion 610. The cartridge retrieval mechanism 122 is mounted on the extension assembly 700 and may be configured to be translated in the direction indicated by the arrow E in FIG. 7. This direction is defined by the rotational position of the extension assembly 700 and permits the cartridge retrieval mechanism 122 to be rotated to the desired orientation and then be extended to either grasp or release a tape cartridge retained by the gripper fingers 704 of the cartridge retrieval mechanism 122. The cartridge retrieval mechanism 122 may include a slide block 708 which engages a flange 706 on the extension assembly 700 and may also be guided in its linear movement by a guide rails 702 and 722. A extension motor 718 may be provided on the extension assembly 700 to rotate a pulley 724, which, in turn, moves a belt 726 which actuates movement of the cartridge retrieval mechanism 122 along the guide rail 702. A sensor 716 may be provided to detect the position of the cartridge retrieval mechanism 122.

The cartridge retrieval mechanism 122 may also be provided with a pair of ribbon cables 710a-710b, which provide data connectivity between interfaces 614a-614b on the rotary assembly 600 and the cartridge retrieval mechanism 122. These ribbon cables 710a-710b may carry control commands to a gripper motor 712 and to carry data to and from an optical positioning sensor 714 on the cartridge retrieval mechanism 122.

As described above, the cartridge transport assembly 120 may include a robotic controller 140, which receives positioning instructions via an umbilical data/power cable 142 from the library controller 104. This robotic controller 140 is incorporated into the z-axis assembly 150 and travels with the z-axis assembly 150 up and down the y-axis during operation.

Figure 8:
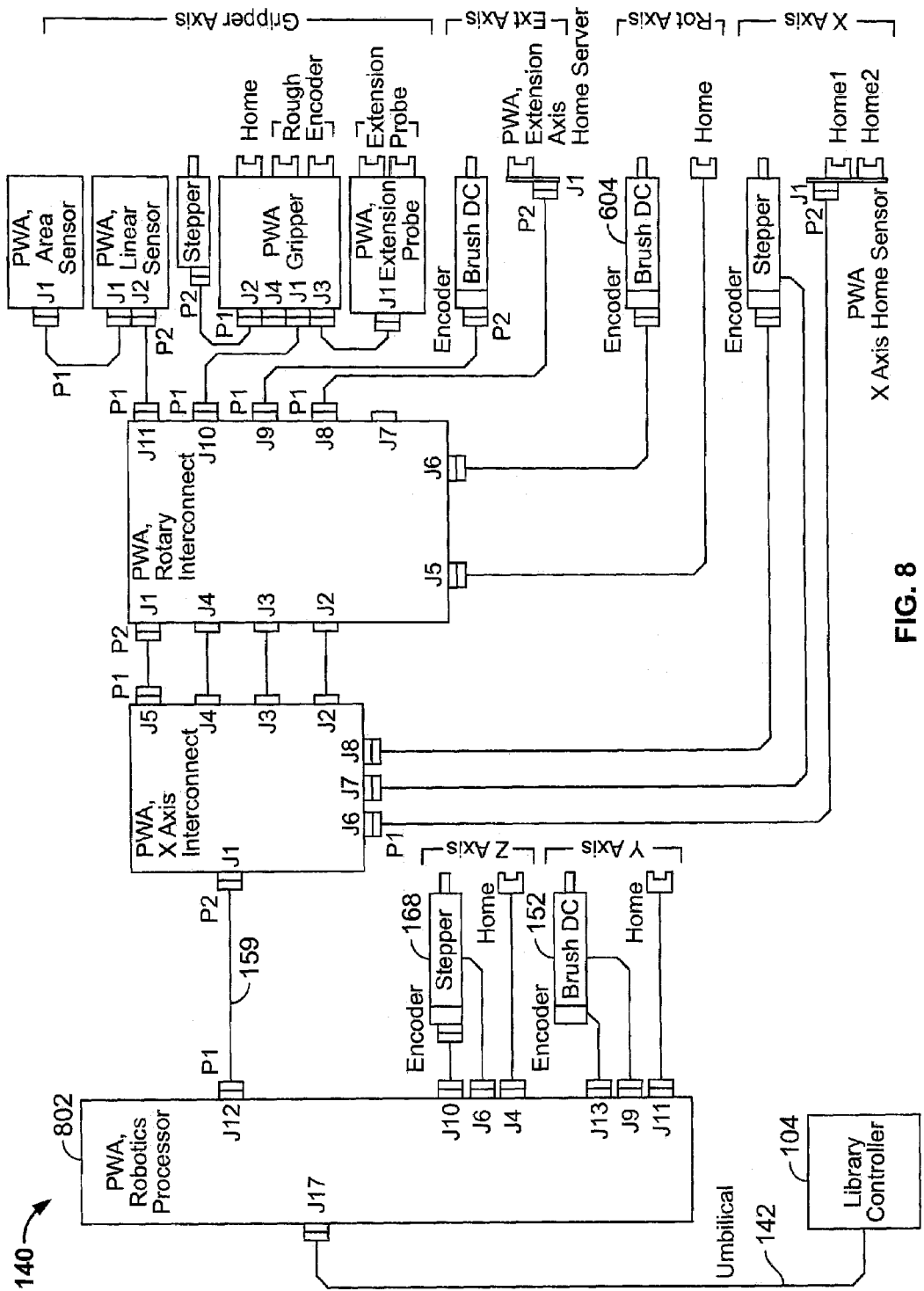
FIG. 8 is a circuit diagram of a robotics controller in accordance with embodiments of the present invention.

FIG. 8 is a schematic diagram of a robotic controller 140, in accordance with embodiments of the present invention. The robotic controller 140 may include a robotics processor printed wiring assembly (PWA) 802, which can perform many of the tasks normally executed by the library controller in conventional storage library systems. In these embodiments, these tasks are offloaded from the library controller and are instead handled by the robotics processor 802. The robotics processor 802 may be configured to control the positioning of the cartridge retrieval mechanism 122 in various ways. In some embodiments, the library controller 104 may receive an I/O request from the host 102 and will determine which tape cartridge 114 will need to be retrieved and loaded into a media drive 112 in order to fulfill the I/O request. The library controller 104 may process the high level I/O request to produce a low level command to the robotic controller 104. For example, the library controller 104 may provide specific motor encoder instructions to be transmitted to the individual actuators in the cartridge transport assembly 120.

In other embodiments, the library controller 104 may provide higher level instructions that need to be further processed by the robotics processor 802 in order to generate the motion profiles. For example, the library controller 104 may issue a command to retrieve the tape cartridge 114 from a particular slot number in the library system 100. The robotics processor 802 receives the command and, given the current position of the cartridge retrieval mechanism 122, determines the appropriate motion profiles to issue to each actuator in order to position the cartridge retrieval mechanism 122 to retrieve the tape cartridge 114 from the desired slot number.

In yet other embodiments, the robotics controller 140 may be configured to respond to high level commands from the library controller 104. This command may be, for example, as simple as "INVENTORY". Upon receiving the INVENTORY command, the robotics controller 140 may be configured to sequentially position the cartridge transport assembly 120 adjacent to each of the slots 116 in the library system 100 to detect the presence and identity of each cartridge 114 loaded in the system 100. The complete inventor can then be returned to the library controller 104.

In yet other embodiments of the present invention, the robotics controller 140 may be further configured with a power supply for receiving power of a particular voltage via the umbilical 142 and converting that power to the appropriate voltage for each of the various motors in the cartridge transport assembly 120. For example, in one embodiment, the library controller 104 transmits 55 V DC current over the umbilical data/power cable 142 to the robotics controller 104. The robotics controller 104 includes a power supply which converts this high voltage 55 V DC current to the logic and drive voltages utilized by the various motors and logic components on the cartridge transport assembly 120. These voltages can be, e.g., 12 V, 5 V, 3 V, 1.8 V, etc. In other embodiments, the current transmitted over the umbilical cable 142 may be an AC current, and the robotics controller 140 may convert the AC current to the drive voltages utilized by the various actuators on the cartridge transport assembly 120.

By providing a single high voltage power supply on the robotics controller 140, the number of conductors on the power cable connecting the power supply to the power-utilizing component (e.g., z-axis motor 168) can be greatly lessened than it would if all the power supply voltages were provided from the library controller 104. In addition, the amount of EMI shielding used on the umbilical cable 142 can be reduced, due to the much lower DC motor currents induced on the cable.

In accordance with embodiments of the present invention, the operation of the cartridge transport assembly 120 is as follows. The library controller 104 receives an I/O command from a host system 102 which requires that data be either written to or read from a tape cartridge 114. Accordingly, the cartridge transport assembly 120 may be instructed to retrieve the tape cartridge 114 from one of the storage slots 116 and insert the cartridge 114 into one of the desired media drives 112. The library controller 104 transmits one or more instructions to the robotics controller 140. As described above, the robotics controller 140 may receive the high level commands from the library controller 104 and determine the optimal series of movements in each of the degrees of freedom of the cartridge transport assembly 120 in order to position the cartridge retrieval mechanism 122 in the desired position.

For example, the robotics controller 140 may be instructed to retrieve the cartridge located in slot 116a and load it into the media drive 112a (as shown in FIG. 2). In order to perform this function, the cartridge retrieval mechanism 122 must be positioned adjacent the slot 116a. This can be done by transmitting a control signal to the encoder for the y-axis actuator 152 to position the cartridge retrieval mechanism 122 at the appropriate position along the y-axis, transmitting a control signal to the encoder for the z-axis actuator 168 to position the cartridge retrieval mechanism 122 at the appropriate position along the z-axis, transmitting a control signal to the encoder for the x-axis actuator 518 to position the cartridge retrieval mechanism 122 at the appropriate position along the x-axis, and transmitting a control signal to the encoder for the rotary motor 604 to rotate the cartridge retrieval mechanism 122 such that the gripper fingers 704 are properly oriented to grasp the cartridge 114 in slot 116a. The robotics controller 140 may issue these signals to perform the positioning in the four degrees of freedom in parallel, in series, or various combinations thereof. The robotics controller 140 may also utilize feedback from optical signals received from the optical positioning sensor 714 in order to position the gripper fingers 704.

Once the gripper fingers 704 are positioned adjacent the cartridge 114, the robotics controller 140 may issue control signals to the extension motor 718, thereby causing the gripper fingers 704 to extend towards the cartridge 114. The robotics controller 140 may then issue the control signal to actuate the stepper motor to cause the gripper fingers 704 to grasp the cartridge 114.

After the cartridge 114 is secured by the cartridge retrieval mechanism 122, the robotics controller 140 may issue a control signal causing the extension motor 718 to withdraw the gripper fingers 704, thereby extracting the cartridge 114 from the slot 1116a. The robotics controller 140 then issues control signals to reposition the cartridge retrieval mechanism 122 in the x-direction, y-direction, z-direction, and rotationally, in order to position the cartridge 114 adjacent the load port for the media drive 112. The extension motor 718 may again be activated to extend the gripper fingers 704 to insert the cartridge 114 into the media drive 112.

Embodiments incorporating the above-described cartridge transport system may achieve numerous advantages over existing designs. For example, embodiments of the present invention may facilitate the verification, testing, and repair of cartridge transport assemblies by enabling the cartridge transport assembly to be more thoroughly tested without needing to be installed in a library enclosure. In other storage libraries, the cartridge transport assembly may comprise a vertical support member mounted in the library enclosure. A gripper assembly may be mounted to the support member and configured to travel up and down the support member to provide movement in the y-direction. The vertical support member is mounted on rails along the top and bottom of the library enclosure to enable the entire support member and gripper assembly to move along the rails in the x-direction. Because the library enclosure is integral with the x-direction positioning of the cartridge transport assembly, if there is a failure in the cartridge transport assembly, the entire library must be tested and repaired. Alternatively, if the gripper assembly is decoupled from the vertical support member for testing, the x-direction movement cannot be tested. If the y-direction actuators are provided on the gripper assembly, then the y-direction movement can be partially tested without mounting the gripper assembly on the support member. However, in order to test the complete range of motion of the cartridge transport assembly, an extensive setup of the vertical support member and the x-direction guide rails must be provided.

In contrast, with embodiments of the present invention, positioning of the gripper assembly in the x-direction and the z-direction in addition to rotational positioning and gripper extension may be provided on a single subassembly 300. In addition, the y-direction actuators are also provided on the subassembly 300, leaving the fixed support member 132 as the only external positioning component. Therefore, the subassembly 300 may be thoroughly tested in the laboratory prior to assembly in the storage library system 100. This can enable a manufacturer to verify proper operation before proceeding with subsequent manufacturing and assembly steps. This process of testing prior to integration can help to reduce manufacturing costs by identifying and repairing failures earlier in the manufacturing process.

This testing may further be facilitated by having the robotics controller 140 provided in the subassembly 300. Because the robotics controller 140 is configured to receive high level commands, it may not be necessary to have an entire library controller 104 in the test laboratory to issue positioning commands to the cartridge transport assembly 120. These commands may be issued to the robotics controller 140 from a personal computer or simplified control system provided in the test laboratory.

The foregoing description of the preferred embodiments of the invention has been presented for the purposes of illustration and description. It is not intended to be exhaustive or to limit the invention to the precise form disclosed. Many modifications and variations are possible in light of the above teaching. For example, in the above-described embodiments, the data is transmitted from the library controller 104 to the robotics controller 140 via the umbilical cable 142. In other embodiments, other methods of passing data between the two controllers may be used, such as, e.g., a wireless data connection.

The various actuators described herein may be implemented in various forms to effectuate relative movements between the various components of the cartridge transport assembly, in accordance with embodiments of the present invention. In particular, various combinations of motors, gears, pulleys, and other actuators may be used. In addition, the specific types of motors and connections described herein are for exemplary purposes only and, in other embodiments, may be replaced with suitable motors and connections as would be understood by one of ordinary skill in the art.

It is intended that the scope of the invention be limited not by this detailed description, but rather by the claims appended hereto. The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A storage library system, comprising:
   a vertical stationary support member having a first major axis oriented vertically; and
   a cartridge transport assembly, comprising:
   a cartridge retrieving mechanism configured to retrieve a removable media cartridge, said cartridge transport assembly being coupled to the vertical stationary support member for movement along the first major axis, wherein the cartridge retrieving mechanism is positionable in five degrees of freedom, wherein:
   a first degree of freedom comprising linear movement along the vertical stationary support member,
   a second degree of freedom comprising linear movement along a second axis approximately orthogonal to the first major axis,
   a third degree of freedom comprising linear movement along a third axis approximately orthogonal to the first major axis and the second axis,
   a fourth degree of freedom comprising rotational movement about a fourth axis, and
   a fifth degree of freedom comprising radial extension of the cartridge retrieving mechanism, the fifth degree of freedom orthogonal to the fourth axis.

2. The storage library system of claim 1, further comprising:
   an enclosure having a first side wall, an opposing second side wall, and a back wall adjacent to the first and second side walls;
   a cavity region between the first side wall, the second side wall, and the back wall, the vertical stationary support member and the cartridge transport assembly being positioned in the cavity region.

3. The storage library system of claim 2, further comprising:
   a plurality of storage bins disposed on the first and second side walls.

4. The storage library system of claim 2, further comprising:
   at least one tape drive disposed on the back wall.

5. The storage library system of claim 1, wherein the cartridge transport assembly comprises a horizontally disposed tray assembly for supporting the cartridge retrieving mechanism.

* * * * *